United States Patent
Mahendran et al.

(10) Patent No.: US 8,042,170 B2
(45) Date of Patent: Oct. 18, 2011

(54) BEARER CONTROL OF ENCRYPTED DATA FLOWS IN PACKET DATA COMMUNICATIONS

(75) Inventors: Arungundram C. Mahendran, Irvine, CA (US); Jun Wang, La Jolla, CA (US); Raymond Tah-Sheng Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 948 days.

(21) Appl. No.: 11/180,131

(22) Filed: Jul. 12, 2005

(65) Prior Publication Data

US 2006/0078120 A1 Apr. 13, 2006

Related U.S. Application Data

(60) Provisional application No. 60/588,664, filed on Jul. 15, 2004.

(51) Int. Cl.
*G06F 9/00* (2006.01)
*G06F 7/04* (2006.01)
*H04L 9/00* (2006.01)

(52) U.S. Cl. .......... 726/13; 726/3; 726/4; 726/5; 726/6; 726/14; 713/168; 713/169; 713/170; 713/171; 713/172

(58) Field of Classification Search .................. 380/255; 726/13

See application file for complete search history.

(56) References Cited

U.S. PATENT DOCUMENTS

| | | | |
|---|---|---|---|
| 5,081,678 A * | 1/1992 | Kaufman et al. | 713/161 |
| 7,120,930 B2 * | 10/2006 | Maufer et al. | 726/11 |
| 7,539,186 B2 | 5/2009 | Aerrabotu et al. | |
| 7,562,393 B2 | 7/2009 | Buddhikot et al. | |
| 7,668,145 B2 | 2/2010 | Le et al. | |
| 2003/0018908 A1 | 1/2003 | Merced et al. | |
| 2003/0060210 A1 | 3/2003 | Ravishankar et al. | |
| 2003/0097584 A1 * | 5/2003 | Haukka et al. | 713/200 |

(Continued)

FOREIGN PATENT DOCUMENTS

EP 1249980 A2 10/2002

(Continued)

OTHER PUBLICATIONS

Nenning Schulzrinne, Jonathan Rosenberg: "The Session initiation Protocol: Internet-Centric Signaling" IEEE Communications Magazine, 'Online! Oct. 2000, pp. 134-141, XP002352523.

(Continued)

*Primary Examiner* — Longbit Chai

(74) *Attorney, Agent, or Firm* — Kam T. Tam; Kristine U. Ekwueme

(57) ABSTRACT

In a communication session in which data flows with encrypted data packets pass through a monitoring intermediary for data traffic control. The encrypted data packets include SPIs (Secured Parameter Indexes) which are used to identify SAs (Security Associations) for data decryption. During the initial signaling process for the communication session, the nodes seeking the communication session include the SPIs in the signaling messages and send the signaling messages through the monitoring intermediary which in turn matches the SPIs of the signaling messages with the corresponding SPIs extracted from the data packets. In enforcing data traffic control, the monitoring intermediary allows data flows to pass through if comparison matches in the SPIs are found. Otherwise, the data flows are rejected.

36 Claims, 5 Drawing Sheets

U.S. PATENT DOCUMENTS

| | | |
|---|---|---|
| 2004/0008632 A1 | 1/2004 | Hsu et al. |
| 2004/0109459 A1 | 6/2004 | Madour et al. |
| 2004/0210766 A1 | 10/2004 | Kroselberg |
| 2005/0223228 A1 | 10/2005 | Ogawa |

FOREIGN PATENT DOCUMENTS

| | | |
|---|---|---|
| EP | 1289227 A2 | 3/2003 |
| JP | 2004180155 | 6/2004 |
| JP | 2005529554 | 9/2005 |
| KR | 100899960 | 5/2009 |
| WO | WO02056562 A1 | 7/2002 |
| WO | 03085904 | 10/2003 |
| WO | WO 03/085904 A1 * | 10/2003 |
| WO | WO2004045159 | 5/2004 |

OTHER PUBLICATIONS

International Search Report—PCT/US2005/025150—International Search Authority—European Patent Office—Nov. 22, 2005.

Schulzrinne, et al., "The Session Initiation Protocol: Internet-Centric Signaling", *IEEE Communication Magazine*, XP002352523, Oct. 2000, pp. 134-141.

O. Egashira, "IPSec and ISAKMP Analysis Software—Utilised for VPN Equipment Interconnect Testing", Interop Magazine (Softbank Publishing Ltd.), vol. 9, 9 (Nov. 1, 1999) pp. 139.

Written Opinion—PCT/US2005/025150, International Search Authority, European Patent Office, Nov. 22, 2005.

Y. Kobayashi, "Practical References of VPN Service", Computer & Network, (Ohmsha, Ltd.), vol. 21, 3 (Mar. 1, 2003), pp. 25-40.

* cited by examiner

BEARER CONTROL OF ENCRYPTED DATA FLOWS IN PACKET DATA COMMUNICATIONS

CLAIM OF PRIORITY UNDER 35 U.S.C §119

The present Application for Patent claims priority to U.S. Provisional Application No. 60/588,664, entitled, "Service Based Bearer Control for Mobile IP Co-located Care of Address," filed on Jul. 15, 2004, and assigned to the assignee hereof and expressly incorporated by reference herein.

REFERENCE TO CO-PENDING APPLICATION FOR PATENT

The present invention relates to U.S. Patent Application entitled "Packet Data Filtering," having Ser. No. 11/180,130, filed concurrently herewith, and assigned to the assignee hereof and expressly incorporated by reference herein.

BACKGROUND

I. Field

The present invention generally relates to packet data communications, and more particularly, to monitoring and controlling of packet data flows during packet data communications.

II. Background

Interconnecting of networks globally allows information to be swiftly accessed irrespective of geographical distances. FIG. 1 shows a simplified schematic drawing of the global connection of networks, commonly referred to as the Internet signified by the reference numeral 20. The Internet 20 is in essence many networks with different levels of hierarchy linked together. The Internet 20 is operated under the IP (Internet Protocol) promulgated by the IETF (Internet Engineering Task Force). Details of the IP can be found in RFC (Request For Comments) 791 published by the IETF.

Connected to the Internet 20 are various individual networks, sometimes called LANs (Local Area Networks) or WANs (Wide Area Networks) depending on the network sizes. Shown in FIG. 1 are some of such networks 22, 24 and 26.

Within each of the networks 22, 24, and 26, there can be various pieces of equipment connected to and in communication with each other. Examples are computers, printers, and servers, to name just a few. Each piece of equipment has a unique hardware address, commonly called the MAC (Media Access Control) address. The piece of equipment with the MAC address is sometimes called a node. When the node communicates beyond its own network via the Internet 20, an IP address needs to be assigned to the node.

The assignment of the IP address can be manual or automatic. The manual assignment of the IP address can be performed by a network administrator, for example. More often, the IP address is automatically assigned. For instance, in a LAN, the IP address can be assigned by a server called the DHCP (Dynamic Host Control Protocol) server (not shown) residing inside in the node's LAN. Furthermore, in a WAN which supports wireless technologies, IP addresses can be assigned automatically and remotely.

Returning now to FIG. 1, as an example, suppose a node 30 in the network 22 attempts to send a data packet to another node 34 in the network 24. Under the IP, each data packet needs to have a source address and a destination address. In this case, the source address is the address of the node 30 in the network 22. The destination address is the address of the node 34 in the network 24. Operating in such a manner, the nodes 30 and 34 are said to be communicating under the Simple IP transport mode in which both nodes 30 and 34 simply use their own IP addresses in the exchange of data packets to conform with the IP.

Advent in wireless technologies allows nodes to move away from their originally registered network to another network. For instance, referring back to FIG. 1, the node 30, instead of permanently wired to the network 22, can be a wireless device, such as a PDA (Personal Device Assistant), a cellular phone, or a mobile computer. The wireless node 30 can travel beyond the boundary of its home network 22. Thus, the node 30 may roam away from its home network 22 to a foreign network 26. Under such scenario, the original address assigned to the node 30 would no longer be applicable to the node 30. As such, data packets destined for that address of the node 30 may not be reachable to the node 30.

The Mobile IP (Mobile Internet Protocol) set forth by the IETF is intended to deal with the node mobility problems. In accordance with the RFC 2002 published by the IETF, whenever away from the home network 22 and roaming in another network, the node 30 is assigned a "care-of address," abbreviated as CoA (Care-of Address).

Under the RFC 2002, there are two types of CoA, namely, the FA CoA (Foreign Agent Care-of Address) and the CCoA (Co-located Care of Address).

The FA CoA is in essence the address of a FA (Foreign Agent) which is a designated server in the foreign network where the node 30 is located at. The use of the FA CoA is applicable in the IPv4.

The CCoA is an individual but temporary address assigned to the node 30 by the foreign network. The use of the CCoA is applicable in both the IPv4 and IPv6.

In any case, anytime the node 30 is in a foreign territory, the node 30 must register the CoA, be it the FA CoA or the CCoA, with its home network 22, so that the home network 22 always knows the whereabouts of the node 30. After registration, the CoA is stored in the routing table maintained by a designated server, called the HA (Home Agent) 25 of the home network 22.

Take a few examples for illustration.

For the case of the FA CoA, suppose the node 30 roams into the foreign network 26. Upon reaching the territorial limit of the foreign network 26, the node 30 receives an advertisement message from the foreign network 26 informing the node 30 of its presence in the foreign territory. From the advertisement message, the node 30 knows the address of the FA 36 of the foreign network 26. The node 30 then registers the FA CoA with the HA 25 in the home network 22.

When the node 30 in the foreign network 26 sends out a data packet to the node 34 in the network 24, for example, knowing the address of the node 34 in the network 24, the data packet can be sent straightforwardly. That is, in accordance with the IP, in the data packet, the source address can be set to the HoA of the node 30 and the destination address can be set to the address of the node 34 in the network 24. The direction of the data packet is shown as data path 38 shown in FIG. 1.

As for the reverse data traffic, it is not as straightforward. In the reverse data route, when the node 34 in the network 24 attempts to send a data packet to the node 30, now in the foreign network 26, as mentioned above, in conformance with the IP, both the source and the destination addresses must be specified in the data packet. In this case, the source address is the IP address of the node 34 in the network 24. As for the destination address, without any update notice from the node 30, the node 34 only knows the HoA of the node 30, not the FA CoA of the node 30. Thus, the destination address will be set to the HoA of the node 30.

Nevertheless, since the FA CoA of the node 30 is stored in the routing table of the HA 25 in the home network 22, when the data packet reaches the home network 22, the HA 25 of the network 22 encapsulates the received data packet with the stored FA CoA and sends it to the node 30 in the foreign network 26. That is, the encapsulated data packet utilizes the FA CoA as the destination address. Once the foreign network 26 receives the encapsulated data packet, the FA 36 merely strips away the encapsulated FA CoA and delivers the original packet to the mobile node 30. The route of the data packet is shown as data path 40 in FIG. 1.

It also should be noted that the data paths, such as the paths 38 and 40, in reality pass through the Internet 20 many times. For the sake of clarity so as not to obscure FIG. 1, the paths merely are shown as passing through the relevant servers, such as the HA 25 and the FA 36. That is, the data paths 38 and 40 are shown as logical paths as shown in FIG. 1.

Operating in the manner as described above, the mobile node 30 is said to be communicating with the correspondent node 34 under the Mobile IP tunneling mode using the FA CoA.

In the above example, a data tunnel is said to exist between the nodes 30 and 34 through the HA 25 even though the mobile node 30 appears to receive data packets straightforwardly from the correspondent node 90. The advantage of using the tunneling mode is that when the mobile node 30 migrates to yet another foreign network, other than the update notice to the home network 22, there is no need for the mobile node 30 to send similar notice to the correspondent node 34. Thus, data sent and received by the correspondent node 34 appear to be uninterrupted.

As for the case of the CCoA, when the node 30 roams away from the home network 22, instead of requesting for a FA CoA, the node 30 can instead request a CCoA from the foreign network. If the network 26 is a WAN supporting wireless technologies such as the cdma2000 standards promulgated by the TIA/EIA (Telecommunications Industry Association/Electronic Industries Association) and the 3GPP2 ($3^{rd}$ Generation Partnership Project 2), the CCoA can be requested and assigned remotely by the foreign network 26 via a PPP (Point-to-Point Protocol) between a PDSN (Packet Data Serving Node) 41 and the mobile node 30, for example. The PDSN 41 is basically a server in the network 36 serving and processing data traffic in the wireless portion of the network 26. However, other than the assignment of the CCoA by the foreign network 26, the node 30 performs all the functions of a foreign agent, such as the FA 36 as mentioned previously. Again, the mobile node 30 needs to register the CCoA with the home network 22.

For instance, to correspond with node 34 in the network 24, the node 30 sends out a data packet with two layers of addresses. In the outer layer, the source address is set to the CCoA, and the destination address is set to the HA 25. In the inner layer, the source address is the HoA of the node 30 and the destination address is the address of the node 34 in the foreign network 24. Upon receipt of the data packet from the roaming node 30, the HA 25 strips off the outer address layer and sends the data packet to the node 34 with the inner address layer. The logical path of the data packet is shown as data path 42 in FIG. 1.

In the reverse data path, that is, when the node 34 sends a data packet to the node 30, the data packet has only one address layer with the source address set to the node 34 and the destination address set to the HoA of the node 30. Upon receipt of the data packet, the HA 25 encapsulates the data packet with the CCoA as the destination address and the address of the HA 25 as the source address and sends the encapsulated data packet to the node 30. The node 30 performs the de-encapsulating on its own without going through the FA 36. The direction of the data packet is shown as data path 44 in FIG. 1.

Operating in the manner as described above, the roaming node 30 is said to be communicating with the correspondent node 34 under the Mobile IP tunneling mode using the CCoA.

Very often, data communications between the nodes need to be monitored and controlled for different reasons. For example, when the mobile node 30 and the corresponding node 34 are in a VoIP (Voice over IP) session, it needs to be certain that the participating parties, the mobile node 30 and the corresponding node 34 in this case, are authorized. Among other things, for each data packet, the source address, the destination address, and the destination port need to be ascertained. If the session is fee-based, means for tracking has to be implemented for purpose of accounting. For security and privacy reasons, it is common that data packets exchanged between the nodes are encrypted. Encryption schemes for packet data under the transport mode and the tunneling mode are different. Monitoring of encrypted data packets thus poses a special challenge. Yet there is increasing demand for secured and private communications over shared networks.

Accordingly, there is need to provide secured monitoring schemes for packet data communications with encrypted data flows.

SUMMARY

For security and confidentiality reasons, very often, data flows are securely transmitted with the communicating data packets encrypted. Sometimes, data flows need to be monitored through a monitoring intermediary for data traffic control. The encrypted data packets include SPIs (Secured Parameter Indexes) which are used to identify SAs (Security Associations) for data decryption. In accordance with an exemplary embodiment of the invention, the nodes seeking communications with one another before establishing any formal data traffic first send the SPIs in signaling messages through the monitory intermediary. Thereafter, the monitoring intermediary matches the SPIs from the signaling messages with the SPIs extracted from the data packets. During data traffic control, the monitoring intermediary allows data flows to pass through if matches in the SPIs are found. Otherwise, the data flows are rejected.

Operating as arranged, the monitoring intermediary can thereby relatively swiftly enforce data traffic control.

These and other features and advantages will be apparent to those skilled in the art from the following detailed description, taken together with the accompanying drawings, in which like reference numerals refer to like parts.

DETAILED DESCRIPTION

The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

The embodiments described below are operable according to the IMS/MMD (IP Multimedia Subsystem/Multimedia Domain) standards promulgated by the $3^{rd}$ Generation Partnership Project (3GPP) and the 3 Generation Partnership Project 2 (3GPP2). A general discussion of the IMS/MMD can be found in published documents, entitled "$3^{rd}$ Generation Partnership Project: Technical Specification Group Services and System Aspects, IP Multimedia Subsystem (IMS), Stage 2" 3GPP TS 23.228 "$3^{rd}$ Generation Partnership Project: Technical Specification Group Core Network, End-to-end Quality of Service (QoS) Signaling Flows," 3GPP TS 29.208; and "IP Multimedia System, Stage 2," 3GPP2 X.S0013-002 and 3GPP2 X.P0013-012.

IMS is applicable in a wide variety of standards such as the cdma2000, WCDMA (Wideband Code Division Multiple Access), GPRS (General Packet Radio Service), and various other WANs.

Figure 1:
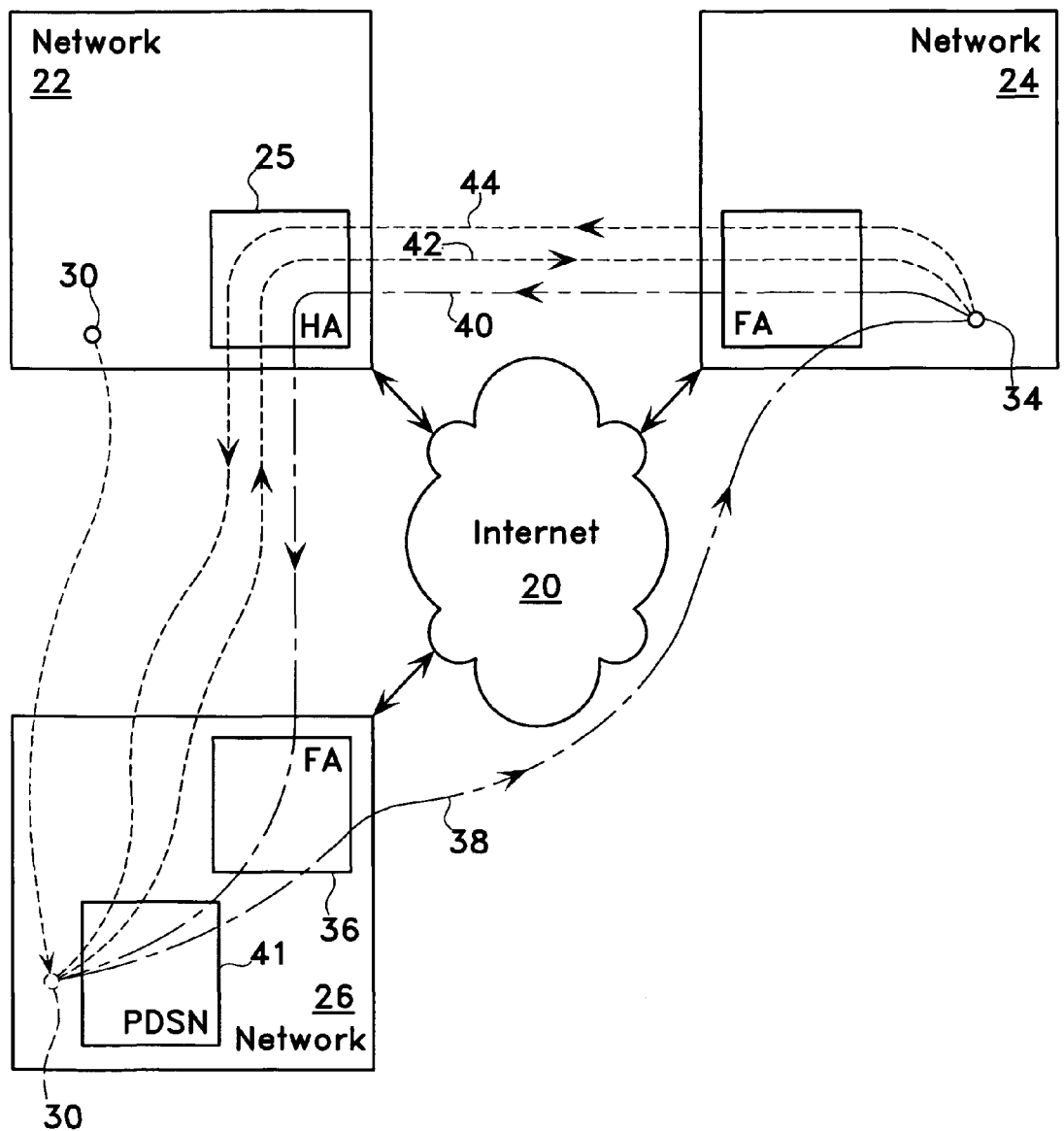
FIG. 1 is a schematic drawing of the global connection of networks.
Figure 2:
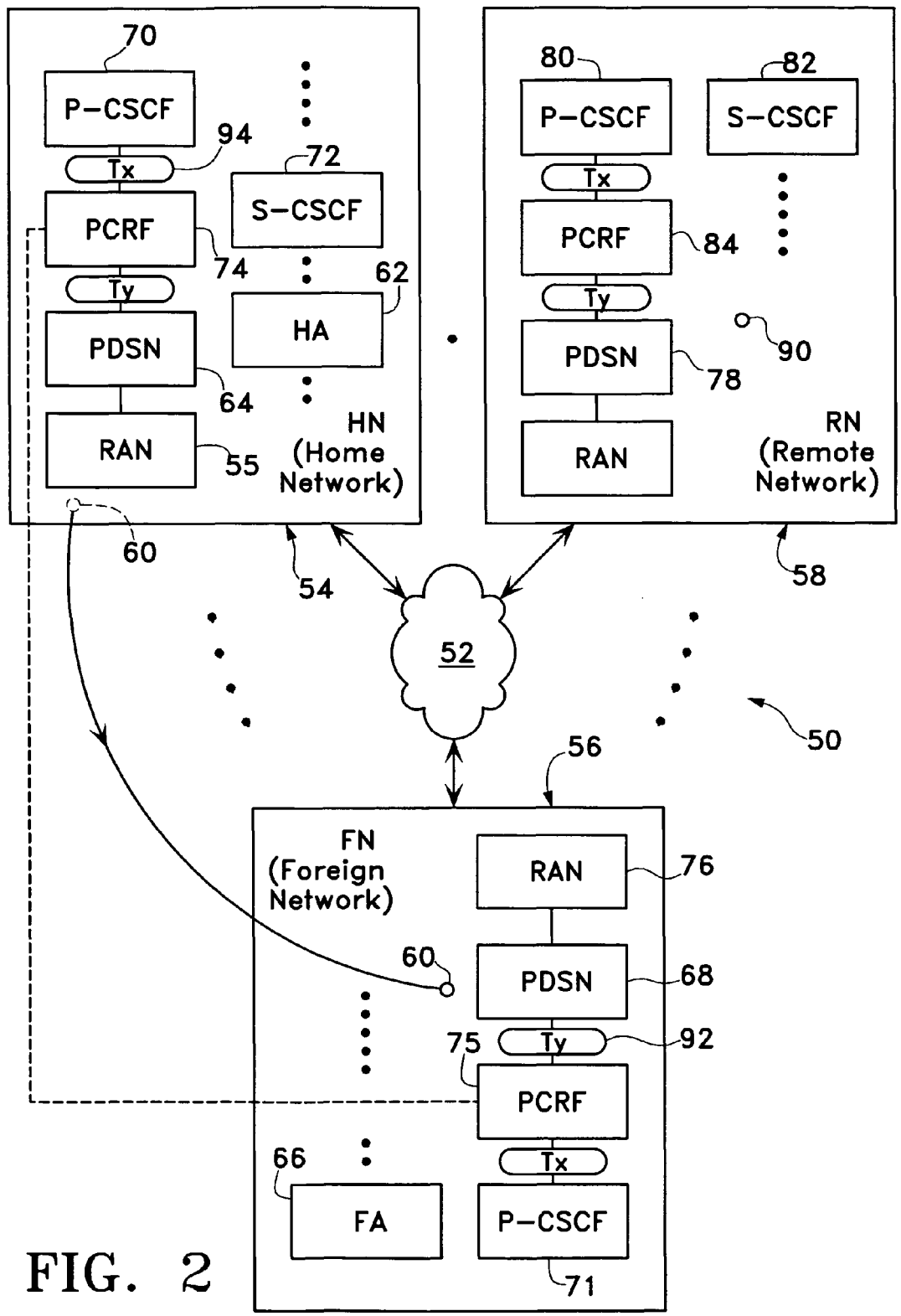
FIG. 2 is a schematic drawing showing an embodiment of the invention.

Reference is now directed to FIG. 2 which schematically shows an exemplary embodiment of the invention. The overall system is generally signified by the reference numeral 50 which includes a backbone network 52, such as an intranet or the Internet.

By way of example, as shown in FIG. 2, connected to the backbone network 52, among other networks, are a HN (Home Network) 54, a FN (Foreign Network) 56, and a RN (Remote Network) 58.

In the HN 54, there is a HA (Home Agent) 62 which assumes the duty of managing data traffic within the HN 54 and also for controlling the data traffic of the HN 54 for inbound and outbound routing. If the HN 54 supports wireless technologies, there is normally a RAN (Radio Access Network) 55 installed and connected to a PDSN (Packet Data Serving Node) 64. For example, if the RAN 55 operates under cdma2000 standards, the RAN 55 commonly includes at least a BSC (Base Station Controller) and a plurality of BSs (Base Stations). The PDSN 64 in essence is an access gateway between the backbone network 52 and the RAN 55.

To execute the various IMS/MMD functions and features, service providers installed different servers in the HN 54. Examples of such servers include a P-CSCF (Proxy Call State Session Function) 70, and a S-CSCF (Serving Call State Session Function) 72. The functional description of these servers will be depicted later along with the operational description of the system 50.

In addition to the nodes described above, there are other nodes within the HN 54 but are not shown for purpose of clarity. Such nodes can be computers of various types, printers, and any other devices which can be mobile or non-mobile.

Shown in FIG. 2 are FN 56 and RN 58 linked to the backbone network 52. Furthermore, for simplicity and ease of explanation, the FN 56 and the RN 58 are illustrated as somewhat similar to the HN 54. It should be appreciated that, depending on usage, the FN 56 and RN 58 can be structured very differently. Thus, in this case, the FN 56 also includes, among other things, a FA (Foreign Agent) 66, a RAN 76, a PDSN 68, a P-CSCF 71, and a PCRF (Policy and Charging Rules Function) 75. Likewise, the RN 58 also includes, among other things, a PDSN 78, a P-CSCF 80, a S-CSCF 82, and a PCRF 84.

It should be noted that in FIG. 2, the FA 66 and the PDSN 68 in the FN 56 are shown as separate entities. Very often, the FA 66 and the PDSN 68 are integrated as one unit.

In the system 50, there is a MN (Mobile Node) 60 which is originally registered with the HA 62 in the HN 54 with a HoA (Home Address). The MN 60 is capable of migrating to other foreign networks, such as the FN 56, and can gain access to the backbone network 52 via the FN 56 or other networks under the Mobile IP (Mobile Internet Protocol). The MN 60 in practice can be in the form of a PDA (Personal Digital Assistant), a laptop computer, or a mobile phone, for example.

Suppose the MN 60 is roaming in the FN 56. In this specific example, assume the user of the MN 60 wants to have a video conferencing session with another user operating a CN (Correspondent Node) 90 in the RN 58. The node 90 can be mobile or non-mobile.

Upon reaching the territory of the FN 56, the MN 60 may acquire the address of the FA 66 via advertisement by the FN 56. The MN 60 then registers the FA CoA with the HA 62 in the HN 54 so that the HA 62 can keep track of the locality of the MN 60. As an alternative, the MN 60 may request a CCoA from the FA 66. The MN 60 then also registers the CCoA with the HA 62 for the same reason, that is, to allow the HA 62 to maintain contact with the MN 60.

Prior to establishing any communication traffic, the MN 60 needs to go through a signaling process. To accomplish this end, the MN 60 sends out an invitation message to the CN 90 via an intermediary as will be described below. Likewise, the CN 90 needs to acknowledge the invitation message with a response signaling process.

In this example, the MN 60 uses the HoA originally assigned by the HA 62 in the HN 54 to register with the S-CSCF 72 in the HN 54 for the access of the SIP (Session Initiation Protocol) network which includes the S-CSCF 72 in the HN 54.

The MN 60 then sends a SIP INVITE message to the P-CSCF 70 in the HN 54. It should be noted that in actual operation, as with all other data traffic, the SIP INVITE message first goes through the RAN 76, the PDSN 68, the FA 66, the backbone network 52, and the HA 62 before reaching the P-CSCF 70. Furthermore, as also well known in the art, the data traffic is in the form of electrical signals via a signal carrier traveling through the system 50. For the sake of clarity in a manner similarly depicted above, the data traffic is simply illustrated as logical paths. That is, in the following description, unless specifically highlighted, only the logical paths of the data traffic are described.

It further should be noted that the MN 60 can send the SIP INVITE message to the P-CSCF 71 in the FN 56 to initiate the conferencing session as an alternative. That is, instead of using the SIP network in the HN 54 for signaling, the MN 60 can use the SIP network in the FN 56 as an alternative. For consistence and clarity in explanation, in the following description, the SIP network in the HN 54 is used for the signaling process.

Suppose the video conferencing session is intended to be a private session. As such, data packets exchanged between the MN 60 and the CN 90 are encrypted, as commonly practiced.

At this juncture, it helps to make a digression explaining IP security in general and further the differences between a non-encrypted and an encrypted data packet in particular.

Under the IP, data packets are encrypted in accordance with IPSec (Internet Protocol Security) which is a security protocol having various standards dealing with data confidentiality, integrity and authentication between participating parties. Details of the IPSec can be found in RFCs 2401, 2412, and 2451.

In accordance with the IPSec, communicating nodes seeking secured communications need first in advance to agree on a set of security parameters, called SA (Security Association). The SA may include, among other things, an encryption algorithm, an authentication algorithm, an encryption key, and an authentication key. Thus, after agreement, the SA is stored in each of the nodes that requests the secured communication session. The common SA is identifiable by a SPI (Security Parameter Index) transmitted along with every data packet. During any secured communication session, the receiving node can always extract the SPI from any data packet and invoke the stored SA for decryption. The SA with the common encryption algorithm and key allows the receiving node to decrypt the encrypted data packets.

Figure 3:
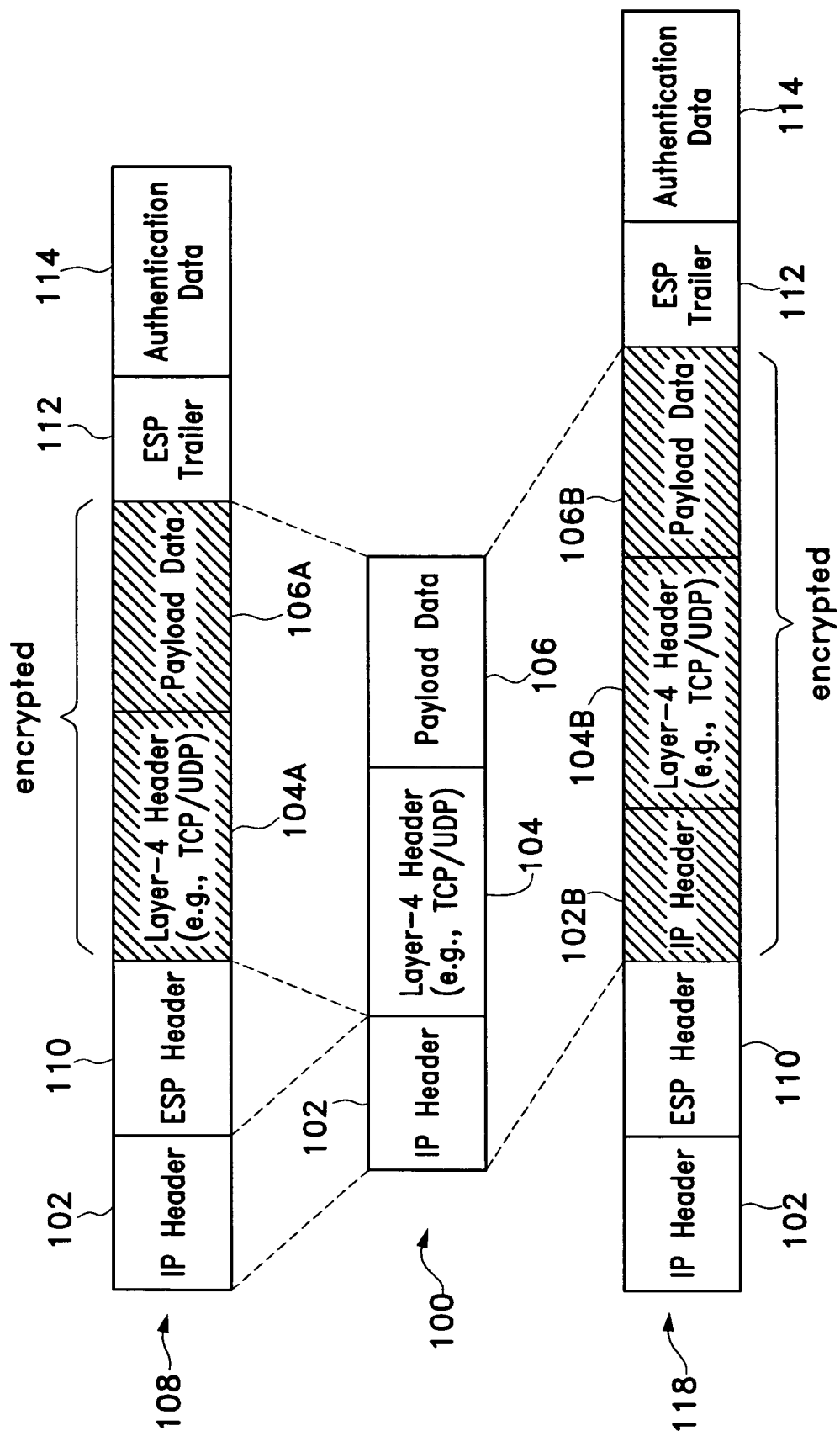
FIG. 3 is a schematic drawing of the various formats of unencrypted and encrypted data packets.

Shown in FIG. 3 are different forms of encrypted and unencrypted data packets.

Reference numeral 100 denotes a common pre-encrypted data packet. Data packet 100 includes an IP header 102 which stores information such as the source and destination addresses of the packet 100, as required under the IP. Adjacent to the IP header 102 is a Layer-4 header 104. Layer 4 is a transport layer which includes information regarding whether the data packet 100 is under the TCP (Transport Control Protocol) or the UDP (User Datagram Protocol). Details of the TCP and the UDP can be found in RFC 793 and RFC 768, respectively. The Layer-4 header 104 thus identifies at the minimum whether the packet 100 is a TCP or a UDP packet, and further includes locations of the source and destination ports. Information about the destination port is essential for the monitoring intermediary to carry out its duty of data monitoring. Adjacent to the Layer-4 header 104 is the payload data 106 carried by the data packet 100.

Reference numeral 108 denotes an encrypted data packet under the transport mode. The hatched portions indicate the data areas under encryption. The encrypted data packet 108 also includes an IP header 102 same as that of the unencrypted packet 100. However, the Layer-4 header 104A and the payload data 106A of the encrypted packet 100 are the encrypted counterparts of the corresponding Layer-4 header 104 and the payload data 106 of the unencrypted data packet 100. In the data packet 108, disposed between the IP head 102 and the Layer-4 header 104A is an ESP (Encapsulating Security Payload) header 110. The ESP header 110 includes the SPI which can be used to identify the SA with the prearranged algorithm for decrypting the data packet 108 as mentioned previously. At the end of the data packet 108 are an ESP trailer 112 and authentication data 114. The ESP trailer 112, among other things, includes information identifying the next ESP header. If any authentication protocol is carried out, the authentication data segment 114 has information for such purpose.

Reference numeral 118 designates an encrypted data packet under the tunneling mode in accordance with the IPSec. In the data packet 118, basically, it is the pre-encrypted packet 100 being encrypted and encapsulated into the packet 118. Thus the packet segments IP header 102B, Layer-4 header 104B, and payload data 106B contain information of the corresponding segments the original packet 110. The front IP header 102 of the packet 118 however has content different from that of the IP header 102B. For instance, the IP header 120 includes the outer layer addresses of the tunnel, and the IP header 102B has inner layer addresses of the tunnel. Adjacent to the IP header 120 is the ESP header 110 which is essentially the same as that of the ESP header 110 in the data packet 108. That is, the ESP header 110 includes the SPI for identifying the SA with a prearranged algorithm for decrypting the data packet 118. The ESP trailer 112 and the authentication data 114 are substantially the same as that of the packet 108.

It should be noted that under the IPv6, after the IP Header 102 in each of the packets 108, 100 and 118, there is an optional header called a "flow label" including information identifying whether the data packet 108, 100 or 118 is an audio or a video packet. The flow label header is not shown in FIG. 3 for reasons of brevity and conciseness.

As can be seen in FIG. 3, in the data packet 108, the Layer-4 header 104A is encrypted. As such, the monitory intermediary cannot identify whether the packet 108 is a TCP packet or a UDP packet, for example. Above all, the Layer-4 header 104A includes information regarding the destination port is also not easily available. Any monitory intermediary, without any information about the destination port, cannot perform any data monitoring.

Likewise, in the data packet 118, in addition to the encryption of the Layer-4 header 104B, the IP header 102B is also encrypted. Without the information from the IP header 104B, the monitoring intermediary further does not know the inner layer addresses of the data packet 118, for instance. Consequently, the data packet 118 cannot possibly be monitored.

As mentioned earlier, embedded in each of the data packets 108 and 118 is the SPI which may be used to identify the associated SA for data encryption. However, in this embodiment, the SPI is also used implicitly to identify and correspond with a particular destination port associated with the encrypted data packet 108 or 118. More specifically, in the encrypted data packet 108 or 118, each SPI in the respective ESP header 110 corresponds to a particular data flow which in turn is characterized by whether the flow is an audio flow or a video flow, for example, and further the identification of the destination port. In accordance with the exemplary embodiment, the SPI is directly sent through and ultimately reaches the monitoring intermediary during the initial signaling process. During data monitoring, the monitoring intermediary merely has to match the SPI obtained during the signaling process to the corresponding SPI extracted from the encrypted data packet. If a match is found, the particular flow, i.e., whether the flow is audio or video along with the destination port of the encrypted data packet can thus be implicitly identified.

Reference is now returned to FIG. 2. To initiate the video conferencing session, the MN 60 sends out a SIP INVITE messages through the SIP network as described earlier. The SIP INVITE message includes a description portion called the SDP (Session Description Protocol) which in essence describes the basic requirements for the proper execution of the requested video conferencing session. For instance, included in the SDP are the IP address and port number of the MN 60, and the codec specification for the session. More importantly, in this embodiment, the SDP includes the SPIs to be used by the MN 60. In this example in which the communication session is a video conferencing session, two SPIs are needed, that is, one for the video flow and the other for the audio flow. As mentioned earlier, each SPI corresponds to a particular data flow which in turn uniquely associates with a particular destination port. To reiterate, during data monitoring, if the SPI included in the SIP INVITE message matches with the SPI extracted from the data packets of bearer traffic, the destination port can be implicitly identified. The bearer traffic is the content flow of audio and video signals of the conferencing session. With the identification of the destination port address, along with the source and destination addresses, the data monitoring intermediary can fulfill its duty of data monitoring.

Returning now to FIG. 2, the P-CSCF 70 in the HN 54 is a node assuming the duty of call session management. Upon receipt of the SIP INVITE message, the P-CSCF 70 forwards the SIP INVITE message to the S-CSCF 72 in the HN 54. The C-CSCF 72 in turn sends the SIP INVITE message to the RN 58 for request of acceptance.

Upon approval of the session by the S-CSCF 72 in the HN 54 and the acceptance of the conferencing session by the CN 90 in the RN 58, the P-CSCF 70 then sends the policy related information, such as the charging rules, authorized QoS (Quality of Service) and the flow identifiers to the PCRF 74 in the HN 54.

At the same time, that is, after the acceptance by the CN 90, the MN 60 sends a TFT (Traffic Flow Template), along with the requested QoS to the PDSN 68 in the FN 56 to set up the bearer traffic.

The PDSN 68 then requests the same policy related information as mentioned earlier, that is, the authorized QoS, charging rules, and the flow identifiers for the conferencing session from the PCRF 75 in the FN 56. The PCRF 75 then relays the request to the PCRF 74 in the HN 54 and obtains the aforementioned parameters for the flows. Any parameters granted by the PCRF 75 have to be in conformance with certain mandated polices. Such policies may include rules dictated under the IMS/MMD standards, specific agreements among networks, such as agreements between the HN 54 and the FN 56 relating to the handling of the bearer traffic, policies particular to a network, such as policies unique only to the FN 56. If the requested conference session is fee-based, the policies may include certain tracking procedures for accounting purposes. Above all, unauthorized traffic will be blocked. The enforcement of the policies is called SBBC (Service Based Bearer Control) under the IMS/MMD standards.

The operational details of the SBBC can be found in a document entitled, "3*GPP2 MMD Service Based Bearer Control Document, Work in Progress,*" 3GPP2 X.P0013-012. Descriptions of the SDP can be found in the document, entitled "IP Multimedia Call Control Protocol Based on SIP and SDP), Stage 3: 3GPP2-X.S0013-0004.

The PCRF 75 in the FN 56 is installed for the decision of all the imposed polices. In the decision process, the PCRF 75 is interposed between the PCRF 74 in the HN 54 and the PDSN 68 in the FN 56. Furthermore, there is a Ty interface 92 interposed between the PDSN 68 and the PCRF 75. There is also a Tx interface 94 disposed between the PCRF 74 and the P-CSCF 70 in the HN 54 as shown in FIG. 2. The aforementioned Ty and Tx interfaces are used for policy control between the conferencing session and the bearer traffic. Details of the Ty and Tx interfaces can be found in the documents, 3GPP TS 23.107 published by 3GPP, and 3GPP2 X.P0013-012 published by 3GPP2.

Returning now to FIG. 2, the requested session parameters stated in the SIP INVITE message, if authorized, are passed to the PDSN 68 from the P-CSCF 70 via the PCRF 74 in the HN 54 and the PCRF 75 in the FN 56.

In this embodiment, the CN 90 is assumed to have a CCoA which is assigned by the RN 58. Thus, upon receipt of the SIP INVITE messages, the CN 90 responds back with a SIP 200 OK message. The SIP 200 OK message basically reaffirms the parameters of the original SIP INVITE message. In addition, in this embodiment, the CN 90 also includes in the SDP of the SIP 200 OK message the SPI to be used by the CN 90 for the bearer traffic. The SIP 200 OK follows the same data path as the SIP INVITE message but in the reverse order.

The MN 60 then confirms the receipt of the SIP 200 OK message by sending an acknowledge message (ACK) back along the same data path as the original SIP INVITE message.

Bearer traffic is thereafter ready to be established by the PDSN 68 in the FN 56 in accordance with the authorized parameters as set forth in the SIP INVITE message.

As stated before, under the IMS/MMD standards, bearer traffic needs to be monitored and controlled via the SBBC by the network. In this example, the PDSN 68 directed by the PCRF 75 in the FN 56 assumes the duty to enforce the SBBC to conform with the polices as aforementioned.

During SBBC enforcement, each data packet needs to be screened before allowed to pass through. Since the data packets of the bearer traffic are encrypted as mentioned earlier, some essential information such as the destination port identification cannot be easily and conveniently available. In this embodiment, as mentioned above, the PDSN 68 has information of the SPIs of the data flow well in advance from the SIP INVITE message and the SIP 200 OK message during the initial signaling processes. In operation, the PDSN 68 extracts the essential information needed for the SBBC from each data packet, such as the source and destination addresses and the SPI which implicitly identifies the data flow, and if the information matches with the corresponding information obtained from the signaling process, the data packet is allowed to pass through as part of the SBBC enforcement. On the other hand, if there is a mismatch, the data packet is said to fail the SBBC and is dropped.

Operating in the manner as described above, that is, with the SPIs included in the SDPs of the signaling messages, the PDSN 68 can swiftly enforce the SBBC for encrypted data traffic of the requested video conferencing session. The enforcement of the SBBC is continuous until the session between the MN 60 and the CN 90 is terminated.

Figure 4:
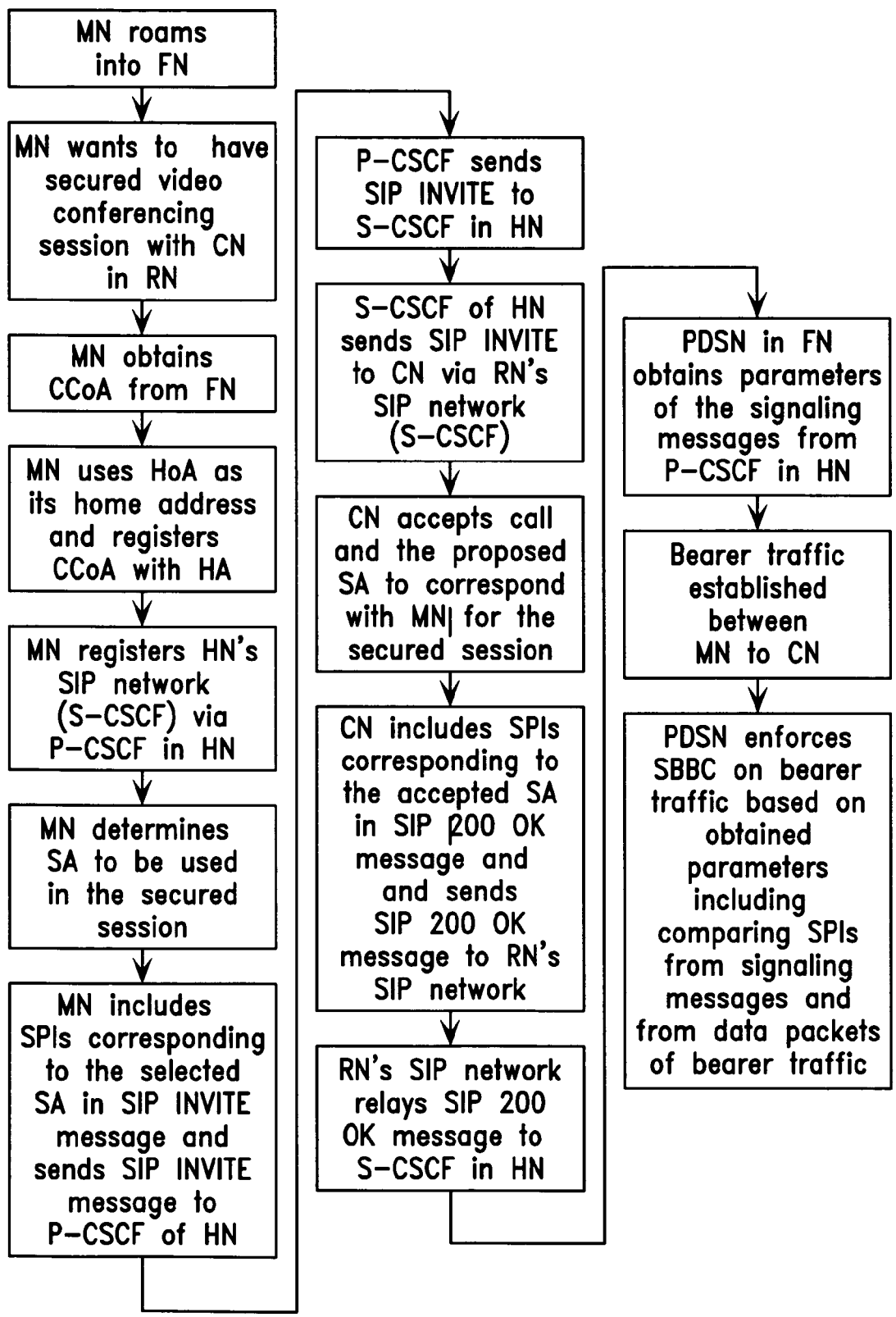
FIG. 4 is a flowchart showing the steps for initiation signaling and establishing content traffic in accordance with the embodiment of the invention.

The process as stated above is shown in the flowchart of FIG. 4.

Figure 5:
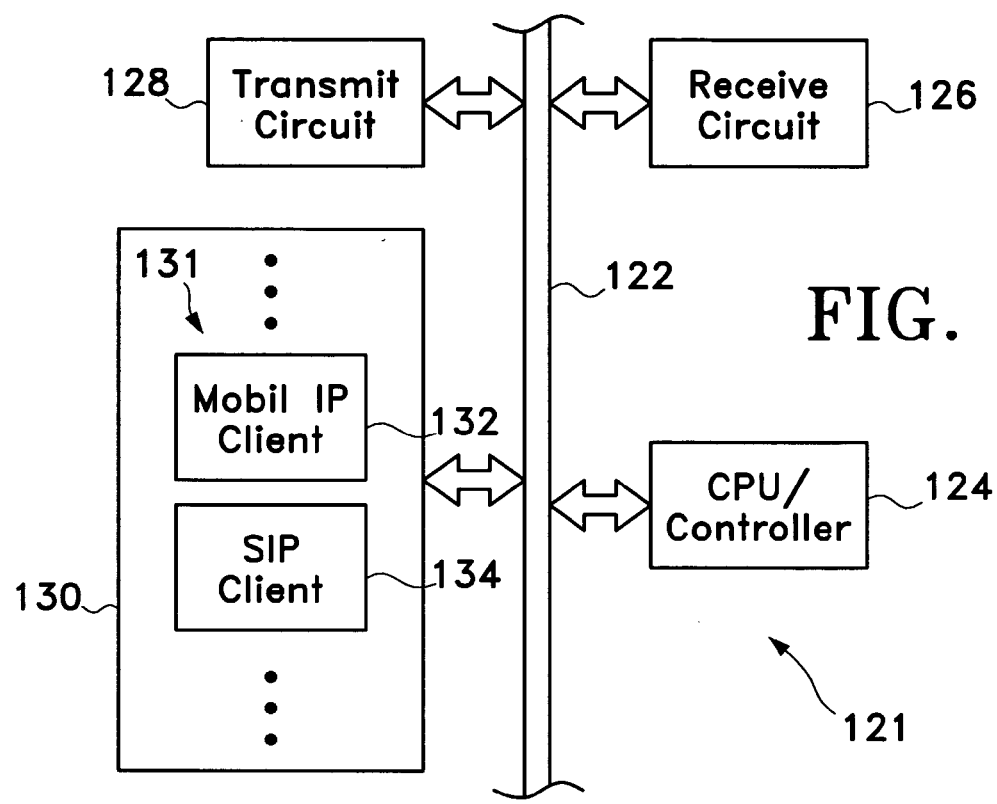
FIG. 5 is a schematic drawing of the circuitry of a mobile node configured in accordance with the invention.

FIG. 5 schematically shows the part of the hardware implementation of a mobile node apparatus signified by the reference numeral 121 in accordance with the invention. The apparatus 121 can be built and incorporated in various devices, such as a laptop computer, a PDA, or a cellular phone, for example The apparatus 121 comprises a central data bus 122 linking several circuits together. The circuits include a CPU (Central Processing Unit) or a controller 124, a receive circuit 126, a transmit circuit 128, and a memory unit 130.

The receive and transmit circuits 126 and 128 can be connected to a RF (Radio Frequency) circuit but is not shown in the drawing. The receive circuit 126 processes and buffers received signals before sending out to the data bus 122. On the other hand, the transmit circuit 128 processes and buffers the data from the date bus 122 before sending out of the device 121. The CPU/controller 124 performs the function of data management of the data bus 122 and further the function of general data processing, including executing the instructional contents of the memory unit 130.

The memory unit 130 includes a set of instructions generally signified by the reference numeral 131. In this embodiment, the instructions include, among other things, portions such as the Mobile IP client 132 and the SIP client 134. The SIP client 134 includes the instructional sets in accordance with the invention as described previously. The Mobile IP client 132 includes the instructional sets for allowing the apparatus 121 to operate under the IP and the Mobile IP, such as acquiring various types of addresses for the various modes of communications, also as described above.

In this embodiment, the memory unit 130 is a RAM (Random Access Memory) circuit. The exemplary instruction portions 132 and 134 are software routines or modules. The memory unit 130 can be tied to another memory circuit (not shown) which can either be of the volatile or nonvolatile type. As an alternative, the memory unit 130 can be made of other circuit types, such as an EEPROM (Electrically Erasable Programmable Read Only Memory), an EPROM (Electrical Programmable Read Only Memory), a ROM (Read Only Memory), a magnetic disk, an optical disk, and others well known in the art.

Figure 6:
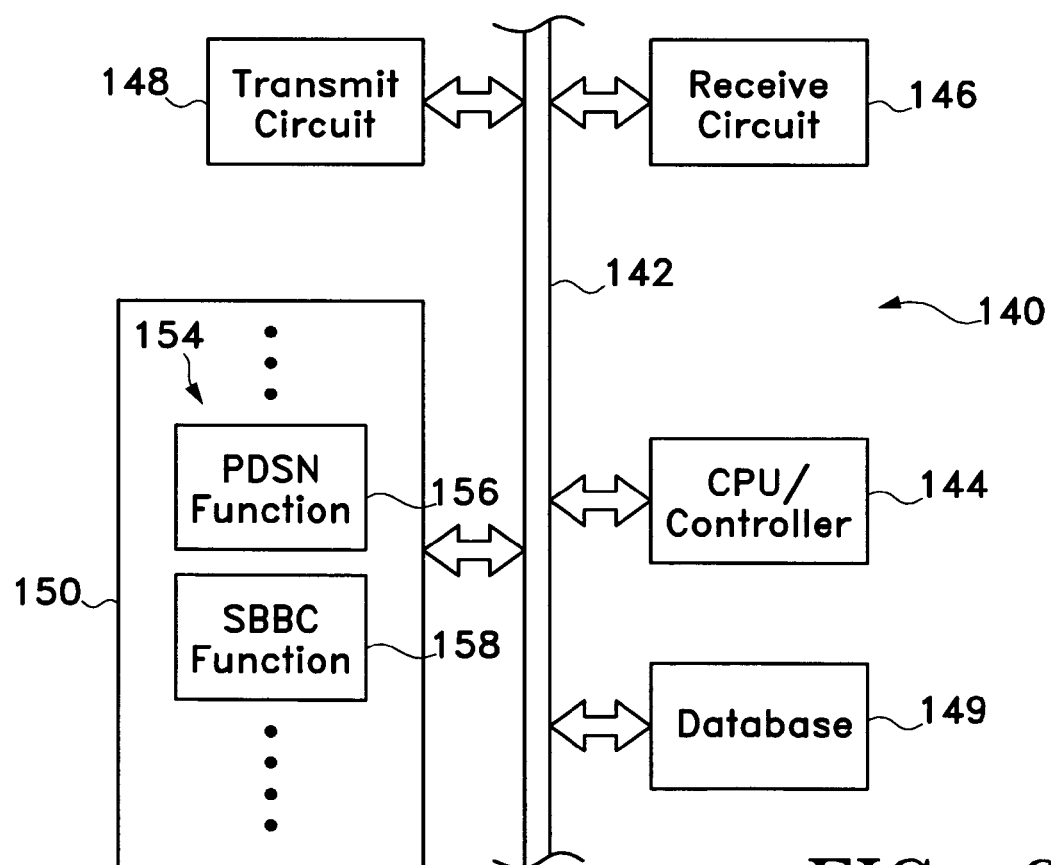
FIG. 6 is a schematic drawing of the circuitry of a monitoring intermediary in accordance with the invention.

FIG. 6 schematically shows the part of the hardware implementation of the PDSN apparatus in accordance with the invention and is signified by the reference numeral 140. The PDSN apparatus 140 comprises a central data bus 142 linking several circuits together. The circuits include a CPU (Central Processing Unit) or a controller 144, a receive circuit 146, a transmit circuit 148, a data base storage unit 149, and a memory unit 150.

The receive and transmit circuits 146 and 148 can be connected to a network data bus (not shown) where the PDSN apparatus 140 is linked to. The receive circuit 146 processes and buffers received signals from the network data bus (not shown) before routing to the internal data bus 142. The transmit circuit 148 processes and buffers the data from the date bus 142 before sending out of the apparatus 140. The CPU/controller 144 performs the duty of data management of the data bus 142 and for the function of general data processing, including executing the instructional content of the memory unit 150. The database storage unit 149 stores data records, such as the SAs with their various parameters.

The memory unit 150 includes a set of instructions generally signified by the reference numeral 154. In this embodiment, the instructions include portions, among other things, a PDSN function 156 and a SBBC function 158. The memory unit can be made of memory circuit types as mentioned above and are not further repeated. The PDSN and SBBC functions 156 and 158 include the instructional sets in accordance with the invention as described previously.

Finally, described in the embodiment is the MN 60 operating under the Mobile IP using the CCoA. As mentioned before, the MN 60 can well operate under other modes of communications and assume other types of addresses. For instance, as an example out of the many alternatives, the MN 60 can use the FA CoA and communicate with the CN 90 under the Mobile IP tunneling mode. In addition, described in the embodiment is encryption is applied bi-directionally between the MN 60 and the CN 90. It is also possible that data encryption is applied one way only, instead of bi-directional. Moreover, as described, the node 60 is depicted as a mobile device roaming to a foreign network. It should be understood that the node 60 can very well be stationary. In addition, any logical blocks, circuits, and algorithm steps described in connection with the embodiments can be implemented in hardware, software, firmware, or combinations thereof. It will be understood by those skilled in the art that theses and other changes in form and detail may be made therein without departing from the scope and spirit of the invention.

What is claimed is:

1. A method for a communication session with encrypted data packets through a monitoring intermediary, comprising:
    providing to a source mobile device an index identifying an encryption process;
    including said index in a signaling message to a destination mobile device; and
    signaling for said communication session between the source and destination devices by sending said signaling message having said index through said monitoring intermediary, wherein said monitoring intermediary is operable to enforce on said communication session a set of security policies associated with said index,
    wherein said enforcement includes matching said index from said signaling message with a corresponding index from the data packets.

2. The method as in claim 1 wherein said signaling for said communication session includes responding through said monitoring intermediary to an invitation to said communication session.

3. The method as in claim 1 further including providing said index in said data packets of said communication session.

4. A method for a communication session with encrypted data packets through a monitoring intermediary in a communication system supported by the IP (Internet Protocol), comprising:
    providing a SPI (Security Parameter Index) identifying a SA (Security Association);
    including said SPI in a signaling message selected from a group consisting of a SIP INVITE message and a SIP 200 OK message; and
    signaling for said communication session by sending said signaling message having said SPI through said monitoring intermediary so as to allow said monitoring intermediary using said SPI for packet data monitoring and for enforcing on said communication session a set of security policies associated with said index,
    wherein said enforcing includes matching said SPI from said signaling message with a corresponding SPI from the data packets.

5. A method for monitoring a communication session with encrypted data packets, comprising:
    receiving at a monitoring intermediary a first index which identifies a decryption process from a signaling message being transmitted from a source mobile device to a destination mobile device;
    receiving at said monitoring intermediary a second index from said data packets of said communication session between the source and destination devices;
    enforcing by said monitoring intermediary a set of policies on said communication session by including comparing said first and second indexes; and
    allowing said data packets of said communication session to pass through said monitoring intermediary when said comparing said first and second indexes results in a comparison match and rejecting said data packets of said communication session from passing through when said comparing said first and second indexes results in a comparison mismatch.

6. The method as in claim 5 wherein said signaling message being a first signaling message, said method further including receiving said first index from a second signaling message.

7. The method as in claim 6 wherein said first signaling message being an invitation message for said communication session, and said second signaling message being a response message for said invitation message.

8. The method as in claim 5, further comprising identifying if said data packets comprise audio data.

9. The method as in claim 5, further comprising identifying if said data packets comprise video data.

10. The method as in claim 5, wherein said method further includes:
    if said first and second indices match, identifying a destination port and passing said data packets to said destination port; and
    if said first and second indices do not match, dropping said packets.

11. A method for monitoring a communication session with encrypted data packets in a communication system supported by the IP (Internet Protocol), comprising:
    receiving a first SPI (Security Parameter Index) from a signaling message selected from a group consisting of a SIP INVITE message and a SIP 200 OK message;
    receiving a second SPI from said data packets of said communication session; and
    enforcing by a monitoring intermediary a set of policies on said communication session by including comparing said first SPI and said second SPI,
    wherein said enforcing includes matching said first SPI from said signaling message with said second SPI from the data packets.

12. An apparatus for a communication session with encrypted data packets through a monitoring intermediary, comprising:
    means for providing to a source mobile device an index identifying an encryption process;
    means for including said index in a signaling message to a destination mobile device; and
    means for sending said signaling message having said index through said monitoring intermediary, wherein said monitoring intermediary is operable to enforce on said communication session a set of security policies associated with said index,
    wherein said enforcement includes matching said index from said signaling message with a corresponding index from the data packets.

13. The apparatus as in claim 12 wherein said signaling message being an invitation message, said apparatus further including means for including said index in a response message in response to said invitation message.

14. The apparatus as in claim 12 further including means for including said index in said encrypted data packets of said communication session.

15. An apparatus for a communication session with encrypted data packets through a monitoring intermediary in a communication system supported by the IP (Internet Protocol), comprising:
    means for providing a SPI (Security Parameter Index) identifying a SA (Security Association);
    means for including said SPI in a signaling message selected from a group consisting of a SIP INVITE message and a SIP 200 OK message; and
    means for sending said signaling message having said SPI through said monitoring intermediary so as to allow said monitoring intermediary using said index for packet data monitoring and for enforcing on said communication session a set of security policies associated with said index,
    wherein said enforcing includes matching said SPI from said signaling message with a corresponding SPI from the data packets.

16. An apparatus for monitoring a communication session with encrypted data packets, comprising:
    means for receiving at a monitoring intermediary a first index which identifies a decryption process from a signaling message being transmitted from a source mobile device to a destination mobile device;
    means for receiving at said monitoring intermediary a second index from said data packets of said communication session between the source and destination devices;
    means for enforcing by said monitoring intermediary a set of policies on said communication session by including comparing said first and second indexes; and
    means for allowing said data packets of said communication session to pass through said monitoring intermediary when said comparing said first and second indexes results in a comparison match and means for rejecting said data packets of said communication session from passing through when said comparing said first and second indexes results in a comparison mismatch.

17. The apparatus as in claim 16 wherein said signaling message being a first signaling message, said apparatus further including means for receiving said first index from a second signaling message.

18. The apparatus as in claim 17 wherein said first signaling message being an invitation message for said packet data communication session, and said second signaling message being a response message for said invitation message.

19. The apparatus as in claim 16, further comprising means for identifying if said data packets comprise audio data.

20. The apparatus as in claim 16, further comprising means for identifying if said data packets comprise video data.

21. An apparatus for monitoring encrypted packet data of a communication session with encrypted data packets in a communication system supported by the IP (Internet Protocol), comprising:
    means for receiving a first SPI (Security Parameter Index) from a signaling message selected from a group consisting of a SIP INVITE message and a SIP 200 OK message;
    means for receiving a second SPI from said data packets of said communication session; and
    means for enforcing by a monitoring intermediary a set of policies on said communication session by including comparing said first SPI and said second SPI,
    wherein said enforcing includes matching said first SPI from said signaling message with said second SPI from the data packets.

22. An apparatus for a communication session with encrypted data packets through a monitoring intermediary, comprising:
    a memory unit having computer-readable instructions for providing an index identifying an encryption process, including said index in a signaling message, and sending said signaling message having said index through said monitoring intermediary, wherein said monitoring intermediary is operable to enforce on said communication session a set of security policies associated with said index, wherein said enforcement includes matching said index from said signaling message with a corresponding index from the data packets; and
    a processor circuit coupled to said memory unit for processing said computer-readable instructions.

23. The apparatus as in claim 22 wherein said signaling message being an invitation message, said apparatus further including computer-readable instructions for including said index in a response message in response to said invitation message.

24. The apparatus as in claim 22 further including computer-readable instructions for including said index in said data packets of said communication session.

25. An apparatus for a communication session with encrypted data packets through a monitoring intermediary in a communication system supported by the IP (Internet Protocol), comprising:
 a memory unit having computer-readable instructions for providing a SPI (Security Parameter Index) identifying a SA (Security Association), for including said SPI in a signaling message selected from a group consisting of a SIP INVITE message and a SIP 200 OK message, and sending said signaling message having said SPI through said monitoring intermediary so as to allow said monitoring intermediary using said index for packet data monitoring and for enforcing on said communication session a set of security policies associated with said index, wherein said enforcing includes matching said SPI from said signaling message with a corresponding SPI from the data packets; and
 a processor circuit coupled to said memory unit for processing said computer-readable instructions.

26. An apparatus for monitoring a communication session with encrypted data packets, comprising:
 a memory unit having computer-readable instructions for receiving at a monitoring intermediary a first index which identifies a decryption process from a signaling message being transmitted from a source mobile device to a destination mobile device, receiving at said monitoring intermediary a second index from said data packets of said communication session between the source and destination devices, and enforcing a set of policies on said communication session by said monitoring intermediary including comparing said first and second indexes, and allowing said data packets of said communication session to pass through said monitoring intermediary when said comparing said first and second indexes results in a comparison match and means for rejecting said data packet of said communication session from passing through when said comparing said first and second indexes results in a comparison mismatch; and
 a processor circuit coupled to said memory unit for processing said computer-readable instructions.

27. The apparatus as in claim 26 further including computer-readable instructions for allowing said data packets of said communication session to pass through said monitoring intermediary when said comparing said first and second indexes results in a comparison match and means for rejecting said data packet of said communication session from passing through when said comparing said first and second indexes results in a comparison mismatch.

28. The apparatus as in claim 26 wherein said signaling message being a first signaling message, said apparatus further including computer-readable instructions for receiving said first index from a second signaling message.

29. The method as in claim 28 wherein said first signaling message being an invitation message for said communication session, and said second signaling message being a response message for said invitation message.

30. The apparatus as in claim 26, wherein the memory unit further comprises computer-readable instructions for identifying if said data packets comprise audio data.

31. The apparatus as in claim 26, wherein the memory unit further comprises computer-readable instructions for identifying if said data packets comprise video data.

32. An apparatus for monitoring a communication session with encrypted data packets in a communication system supported by the IP (Internet Protocol), comprising:
 a memory unit having computer-readable instructions for receiving a first SPI (Security Parameter Index) from a signaling message selected from a group consisting of a SIP INVITE message and a SIP 200 OK message, receiving a second SPI from said data packets of said communication session, and enforcing by a monitoring intermediary a set of policies on said communication session by including comparing said first SPI and said second SPI, wherein said enforcing includes matching said first SPI from said signaling message with said second SPI from the data packets; and
 a processor circuit coupled to said memory unit for processing said computer-readable instructions.

33. A memory unit, comprising:
 instructions for providing to a source mobile device an index identifying an encryption process;
 instructions for including said index in a signaling message to a destination mobile device;
 instructions for signaling for said communication session between the source and destination devices by sending said signaling message having said index through a monitoring intermediary, wherein said monitoring intermediary is operable to enforce on said communication session a set of security policies associated with said index; and
 instructions for enforcing said security policies by matching said index from said signaling message with a corresponding index from the data packets.

34. A memory unit, comprising:
 instructions for receiving at a monitoring intermediary a first index which identifies a decryption process from a signaling message being transmitted from a source mobile device to a destination mobile device;
 instructions for receiving at said monitoring intermediary a second index from data packets of said communication session between the source and destination devices; and
 instructions for enforcing by said monitoring intermediary a set of policies on said communication session by including comparing said first and second indexes; and
 instructions for allowing said data packets of said communication session to pass through said monitoring intermediary when said comparing said first and second indexes results in a comparison match and rejecting said data packets of said communication session from passing through when said comparing said comparing said first and second indexes results in a comparison mismatch.

35. The memory unit as in claim 34, further comprising instructions for identifying if said data packets comprise audio data.

36. The memory unit as in claim 34, further comprising instructions for identifying if said data packets comprise video data.

* * * * *